United States Patent Office 3,455,920
Patented July 15, 1969

3,455,920
2,3-DIHYDRO-5 AND 6-SUBSTITUTED-2-PHENYL-4(1H)-QUINAZOLINONES
Harry L. Yale, New Brunswick, N.J., assignor to E. R. Squibb & Sons, Inc., New York, N.Y., a corporation of Delaware
No Drawing. Filed Jan. 13, 1967, Ser. No. 609,002
Int. Cl. C07d 51/46
U.S. Cl. 260—251   7 Claims

ABSTRACT OF THE DISCLOSURE

This invention relates to novel nitro, hydroxy or hydroxyamino - substituted 2,3 - dihydro - 2-phenyl-4(1H)-quinazolinones. These compounds have shown cytotoxic activity.

---

This invention relates to a novel quinazolinone of the formula

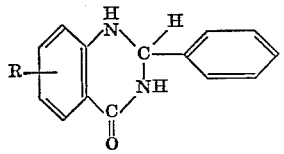

wherein R is a radical selected from the group consisting of nitro, hydroxy and hydroxyamino.

Preferred compounds in accordance with the above formula include 2,3-dihydro-6-nitro-2-phenyl-4(1H)-quinazolinone;
2,3-dihydro-5-hydroxy-2-phenyl-4(1H)-quinazolinone;
2,3-dihydro-6-hydroxy-2-phenyl-4(1H)-quinazolinone;
2,3-dihydro-5-nitro-2-phenyl-4(1H)-quinazolinone;
2,3-dihydro-6-(hydroxylamino)-2-phenyl-4(1H)-quinazolinone; and
2,3-dihydro-5-hydroxylamino-2-phenyl-4(1H)-quinazolinone.

The compounds of this invention have shown a high degree of activity in inhibiting the multiplication of Earle's L cell line of mouse fibroblasts growing in suspension according to the test procedure of Perlman, et al., Proc. Soc. Exptl. Biol. Med., 102 290 (1959), having an $ED_{50}$ of <6 mcg./ml. in this test. $ED_{50}$ is the concentration required to accomplish a 50% inhibition of normal multiplication. In addition, these compounds have shown in vivo cytotoxic activity in the Walker carcinoma 256 tumor system.

The compound of this invention is prepared in accordance with the following reaction schema:

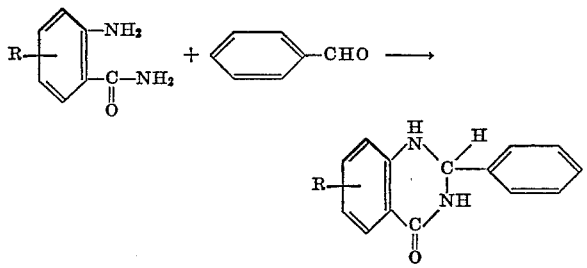

In this reaction, the reactants are heated in a solvent with a boiling point between 100–160° C., e.g., toluene or chlorobenzene with an acidic catalyst, e.g., p-toluenesulfonic acid, and the water formed in the reaction removed by means of calcium hydride. Alternately, the reaction may be carried out under reflux, in the presence of an alcohol, e.g., methanol, ethanol, 2-propanol, or n-propanol, as solvent, and an alkaline catalyst, e.g., sodium hydroxide or potassium hydroxide.

The (hydroxylamino) derivatives may be prepared by any of the known methods for preparing such derivatives by the reduction of aromatic nitro groups, but preferably by the partial reduction at 15–20° by means of hydrogen, over a palladium catalyst.

The preparation of the novel compounds of this invention is illustrated in the following examples.

EXAMPLE 1

2,3-dihydro-6-nitro-2-phenyl-4(1H)-quinazolinone

A mixture of 0.2 g. of p-toluenesulfonic acid monohydrate and 250 ml. of chlorobenzene is distilled in a special apparatus constructed so that the condensed vapors percolate downward through a supported bed of 8–14 mesh calcium hydride and are dried by that reagent before returning to the reaction flask. When the evolution of hydrogen from the calcium hydride indicates the absence of water in the distillate, 3.6 g. (0.02 mole) of 2-amino-5-nitrobenzamide and 2.1 g. (0.02 mole) of benzaldehyde are added. The distillation of this mixture in the same apparatus is continued until there is no evidence of reaction with the calcium hydride (about one hour). The solid which separates on cooling the reaction mixture is filtered; when air-dried, it weighs 4.8 g. Recrystallization from 500 ml. of n-propanol-water (2:1) gives 4.0 g. of 2,3 - dihydro-6-nitro-2-phenyl-4(1H)-quinazolinone, M.P. 263–270° dec.

EXAMPLE 2

2,3-dihydro-5-hydroxy-2-phenyl-4(1H)-quinazolinone (a) 2-amino-6-hydroxybenzamide is prepared by the following synthetic sequence: 4-nitroisatin is catalytically hydrogenated over a palladium catalyst to give 4-aminoisatin; the 4-aminoisatin is diazotized, and the diazonium compound decomposed to give 4-hydroxyisatin; the 4-hydroxyisatin is treated with benzoyl chloride in aqueous sodium hydroxide to give 4-(benzoyloxy)isatin; the 4-(benzoyloxy)isatin is treated with chromic oxide in acetic acid to give 5-(benzoyloxy)isatoic anhydride; and, the 5-(benzoyloxy)isatoic anhydride is treated with aqueous ammonia to give 2-amino-6-hydroxybenzamide.

(b) Following the procedure of Example 1 but substituting 3.1 g. of the 2-amino-6-hydroxybenzamide for the 2-amino-5-nitrobenzamide, there is obtained the desired product, 2,3 - dihydro-5-hydroxy-2-phenyl-4(1H)-quinazolinone.

EXAMPLE 3

2,3-dihydro-6-hydroxy-2-phenyl-4(1H)-quinazolinone (a) Following the procedure of Example 1 but substituting 3.1 g. of 2-amino-5-hydroxybenzamide for the 2-amino-5-nitrobenzamide, there is obtained the desired product, 2,3 - dihydro-6-hydroxy-2-phenyl-4(1H)-quinazolinone.

(b) By substituting 5-nitroisatin for the 4-nitroisatin in Example 3(b), there is obtained the desired intermediate, 2-amino-5-hydroxybenzamide.

EXAMPLE 4

2,3-dihydro-5-nitro-2-phenyl-4(1H)-quinazolinone (a) Following the procedure of Example 1 but substituting 3.62 g. of 2-amino-6-nitrobenzamide for the 2-amino-5-nitrobenzamide, there is obtained 2,3-dihydro-5-nitro-2-phenyl-4(1H)-quinazolinone.

(b) When 4-nitroisatin is treated with chromic oxide in acetic acid, there is obtained 5-nitroisatoic anhydride; 5-nitroisatoic anhydride and aqueous ammonia give 2-amino-6-nitrobenzamide.

EXAMPLE 5

2,3-dihydro-6-(hydroxylamino)-2-phenyl-4(1H)-quinazolinone

To a suspension of 4.0 g. of 2,3-dihydro-6-nitro-2-phenyl-4(1H)-quinazolinone in 100 ml. of absolute ethanol is added 0.5 g. of 5% palladium on carbon catalyst and the mixture is shaken under 50 p.s.i. of hydrogen at 15–20° until 2 mole equivalent of hydrogen are absorbed. The excess hydrogen is promptly removed by applying vacuum. The mixture is filtered free of catalyst and the filtrate concentrated in vacuo under nitrogen to give 2,3-dihydro-6-(hydroxylamino)-2-phenyl-4(1H)-quinazolinone.

What is claimed is:

1. A compound of the formula

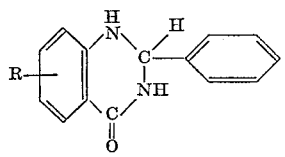

wherein R is a radical selected from the group consisting of nitro, hydroxy and hydroxyamino.

2. A compound in accordance with claim 1 having the name 2,3-dihydro-6-nitro-2-phenyl-4(1H)-quinazolinone.

3. A compound in accordance with claim 1 having the name 2,3 - dihydro-5-hydroxy-2-phenyl-4(1H)-quinazolinone.

4. A compound in accordance with claim 1 having the name 2,3 - dihydro-6-hydroxy-2-phenyl-4(1H)-quinazolinone.

5. A compound in accordance with claim 1 having the name 2,3 - dihydro - 6 - hydroxylamino-2-phenyl-4(1H)-quinazolinone.

6. A compound in accordance with claim 1 having the name 2,3 - dihydro - 5 - hydroxylamino-2-phenyl-4(1H)-quinazolinone.

7. A compound in accordance with claim 1 having the name 2,3-dihydro-5-nitro-2-phenyl-4(1H)-quinazolinone.

References Cited

UNITED STATES PATENTS 3,162,636   12/1964   Gurien et al. _____ 260—251

NICHOLAS S. RIZZO, Primary Examiner

R. V. RUSH, Assistant Examiner

U.S. Cl. X.R.

260—999